March 17, 1970 — J. H. GERMER — 3,501,377
PRESSURE BALANCED FUEL BUNDLE INLET
Filed Feb. 10, 1969 — 3 Sheets-Sheet 1
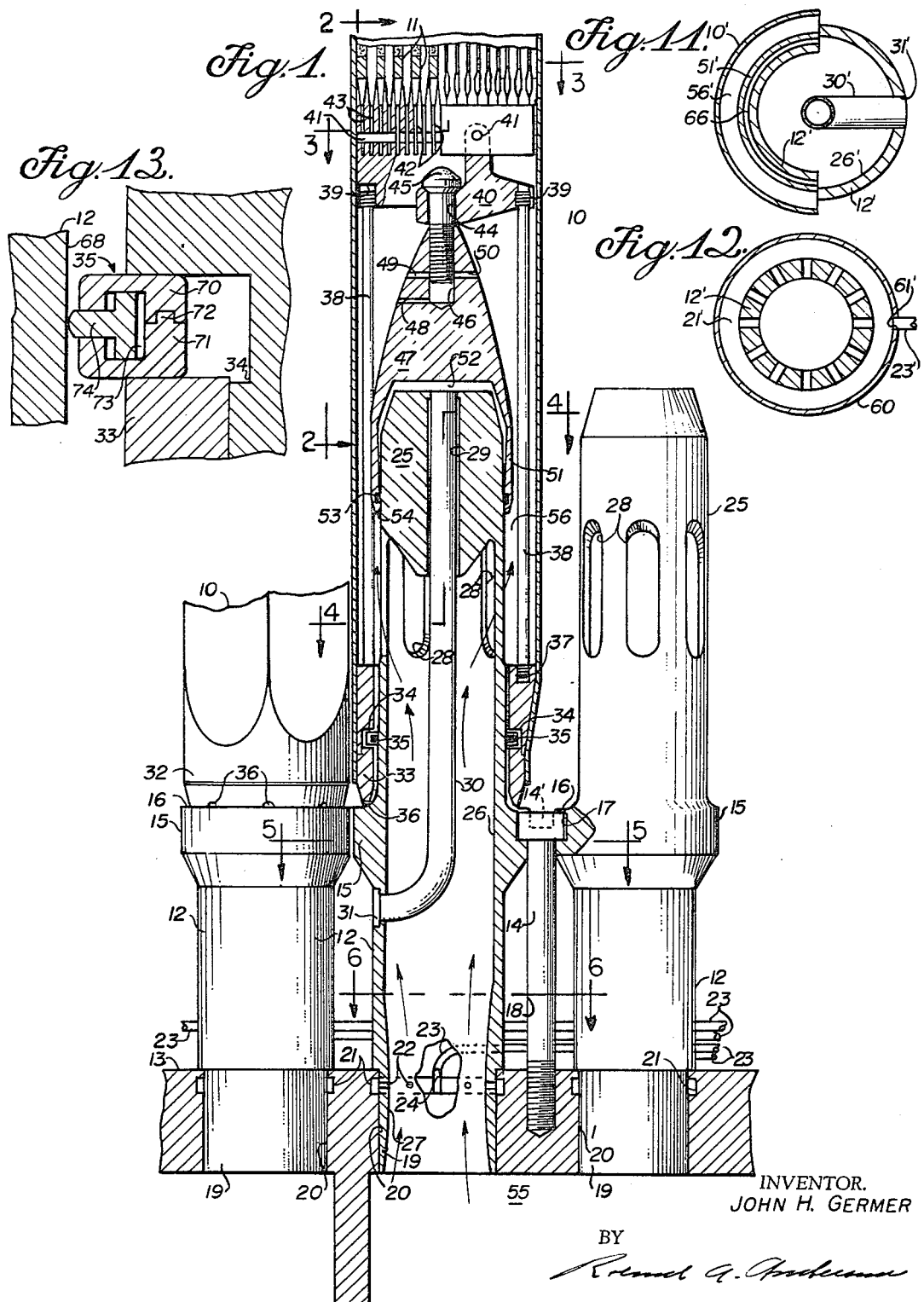
INVENTOR.
JOHN H. GERMER
BY
ATTORNEY

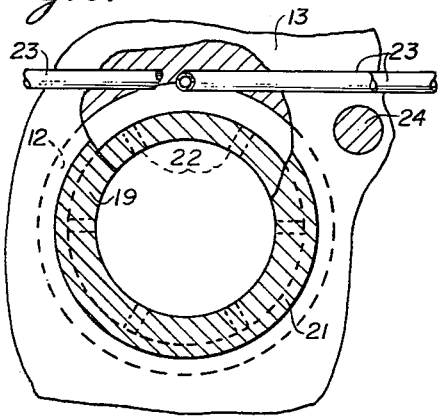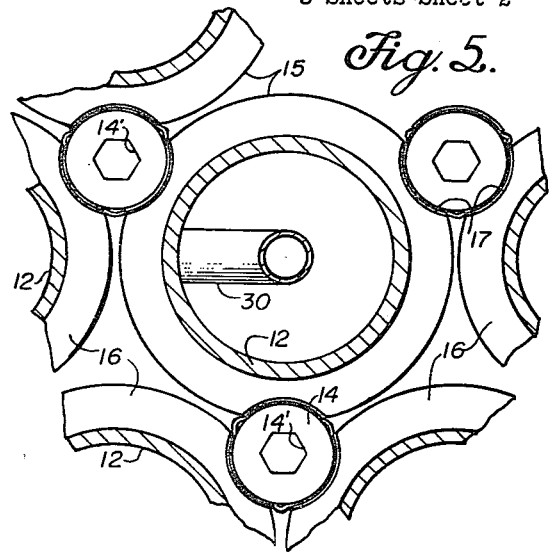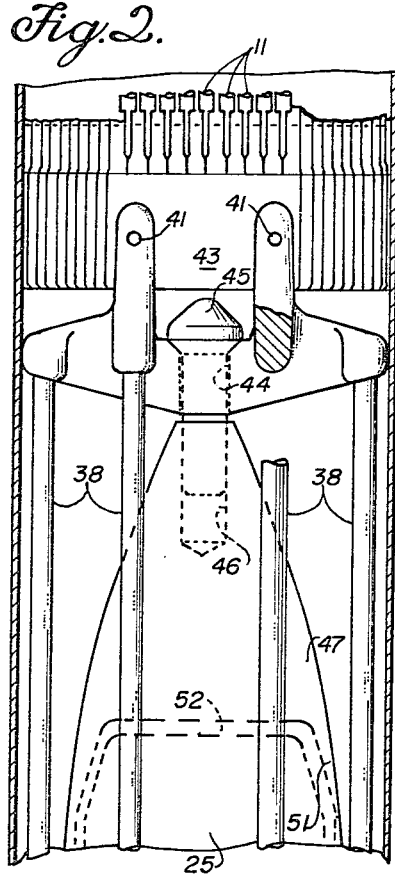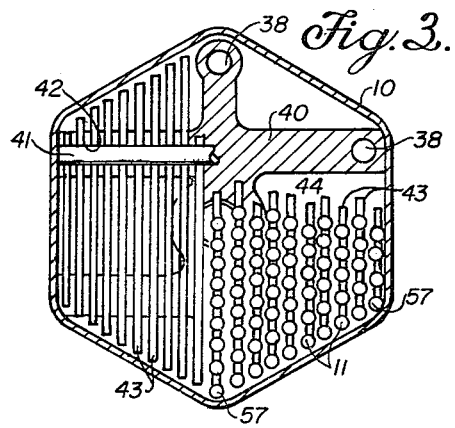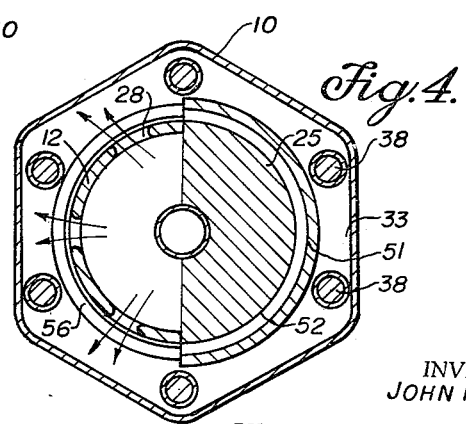
INVENTOR.
JOHN H. GERMER
ATTORNEY

March 17, 1970 — J. H. GERMER — 3,501,377
PRESSURE BALANCED FUEL BUNDLE INLET
Filed Feb. 10, 1969 — 3 Sheets-Sheet 3
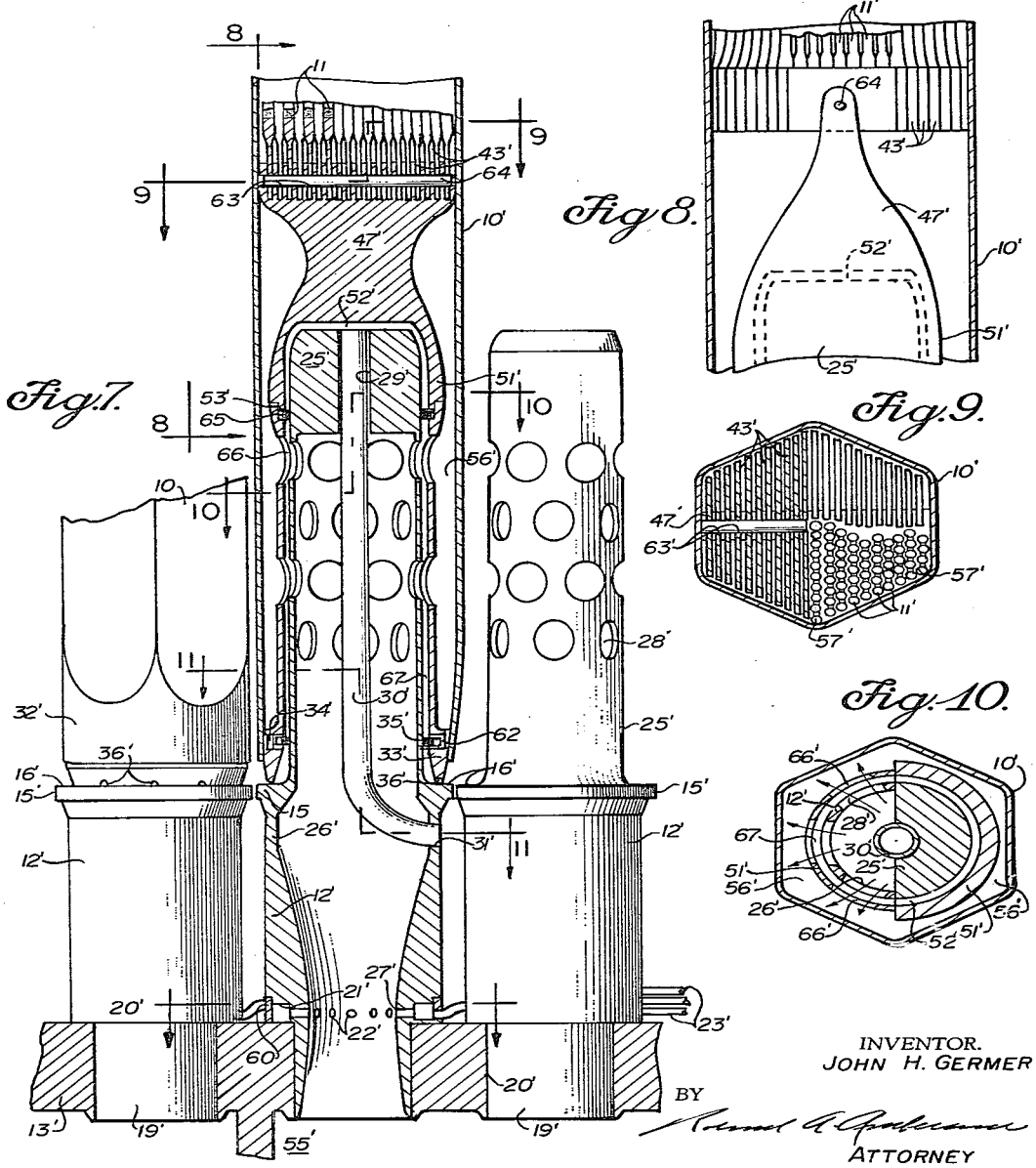

United States Patent Office 3,501,377
Patented Mar. 17, 1970

3,501,377
PRESSURE BALANCED FUEL BUNDLE INLET
John H. Germer, San Jose, Calif., assignor to the United States of America as represented by the United States Atomic Energy Commission
Filed Feb. 10, 1969, Ser. No. 797,744
Int. Cl. G21c 3/04, 19/28
U.S. Cl. 176—19                                          9 Claims

ABSTRACT OF THE DISCLOSURE

A nuclear reactor fuel bundle inlet including means for preventing lifting forces due to hydrostatic pressure differential at the entrance to the fuel bundle, while permitting radial misalignment, as well as the possibility of monitoring coolant flow to the individual fuel bundles. This is accomplished by utilizing seals of approximately equal areas, where the seals are exposed to the pressure differential in opposing directions, thus the pressure forces are essentially balanced. In addition, a rocking motion is provided to allow for misalignment.

BACKGROUND OF THE INVENTION

The invention described herein was made in the course of, or under, Subcontract 31–109–38–1997 under Contract No. W–31–109–ENG–38, with the United States Atomic Energy Commission.

This invention relates generally to nuclear reactors, and more particularly to a pressure balanced fuel bundle inlet which eliminates the upward acting inlet momentum force of the reactor coolant to provide a hydraulic holddown action for the fuel bundles while permitting radial misalignment and monitoring coolant flow to the fuel bundles.

In most nuclear reactors, the core is composed of a plurality of vertically disposed fuel bundles supported upon a grid plate. The lower end of each fuel bundle is provided with an inlet nozzle for admitting the fluid coolant into the fuel bundle. In operation, the coolant is forced vertically upward through each fuel assembly where it serves to cool each discrete fuel pin or rod within the bundle. The coolant is in turn heated before it emerges at the top of the fuel bundles.

For power producing purposes it is of course necessary to provide a sizable reactor so that a substantial quantity of coolant can be heated to a substantially elevated temperature. Accordingly, it then becomes necessary to effect the necessary coolant flow rate.

The fuel bundles of such a typical reactor are subjected to a high rate of upward flow of coolant, and as a result have an upward pressure force which is often considerably greater than the weight of the fuel bundle. Therefore, it is necessary either to provide a means for holding down the fuel bundle or to construct the inlet in such a way that pressure forces are essentially balanced.

Initially the prior effort was directed to provide fuel bundle holddown mechanisms which either clamped or weighted down the fuel bundles, which approach was not satisfactory because of the added cost and complications in structure and operation.

More recently, development of fuel bundle designs have incorporated hydraulic holddown arrangements. Typical of this type of approach has been based on the advantages of the venturi effects, which, however, has not proven satisfactory. Also, other types of hydraulic holddown arrangements have been developed, as exemplified by U.S. Patent No. 3,401,081 to G. Menzel et al., which utilizes coolant inlet orifices perpendicular to the longitudinal axis of the fuel bundle. While this approach has certain advantages, it does not provide a hydraulic holddown which allows for radial misalignment of the fuel bundle or allow for monitoring coolant flow to the individual fuel bundles. In addition with the perpendicular coolant inlet orifices, the coolant flowing to the center of the core tends to be starved, since it must pass horizontally across the inlets of the outer fuel bundles.

SUMMARY OF THE INVENTION

The present invention provides a pressure-balanced fuel bundle inlet which overcomes the disadvantages of the prior art approaches. The hydraulic balance is essentially accomplished by utilizing pairs of seals of approximately equal areas, where the seals are exposed to the pressure differential in opposing directions while allowing for radial misalignment. In addition, a venturi inlet arrangement is utilized which provides sufficient coolant to all portions of the reactor core, while allowing for monitoring the coolant flow to the individual fuel bundles.

Therefore, it is an object of this invention to provide a pressure balanced fuel bundle inlet for a nuclear reactor.

A further object of the invention is to provide a fuel bundle coolant inlet arrangement which eliminates the upward acting inlet momentum force resulting from coolant flow thereinto.

Another object of the invention is to provide nuclear fuel bundles with a hydraulic holddown arrangement which additionally permits radial misalignment.

Another object of the invention is to provide a pressure balanced inlet for nuclear fuel bundles which allows for radial misalignment and permits monitoring of the coolant flowing into the fuel bundles.

Another object of the invention is to provide a hydraulic holddown arrangement for nuclear fuel bundles which includes seals of approximately equal areas, and where the seals are exposed to the pressure differential in opposing directions, thus balancing the pressure forces thereon.

Other objects and advantages of the invention will become readily apparent from the following description and accompanying drawings.

BRIEF DESCRIPTION OF THE DRAWINGS

FIGURE 1 is a view, partially in cross-section, of the lower portion of one embodiment of a nuclear fuel bundle incorporating the inventive pressure balanced inlet;

FIGURE 2 is a side view of the upper portion of the FIGURE 1 embodiment taken along the line 2—2 thereof;

FIGURES 3–6 are cross-sectional views taken along the lines 3—3, 4—4, 5—5 and 6—6, respectively, of FIGURE 1;

FIGURE 7 is a view, partially in cross-section, of the lower portion of another embodiment of a nuclear fuel bundle incorporating the invention;

FIGURE 8 is a side view of the upper portion of the FIGURE 7 embodiment taken along the line 8—8 thereof;

FIGURES 9–12 are cross-sectional views of FIGURE 7 taken respectively along the lines 9—9, 10—10, 11—11 and 12—12 thereof; and FIGURE 13 is an enlarged partial cross-sectional view of the seal assembly of the FIGURES 1 and 7 embodiments.

DESCRIPTION OF AN EMBODIMENT

Referring now to the embodiment illustrated in FIGURES 1–6, the fuel bundles incorporating the invention basically consist of a generally hexagonal tube or casing 10 containing fuel pins or elements 11 in the upper end thereof, and mounted in sealed relationship at the lower end thereof on a fuel bundle support 12 which is attached to a reactor core grid or support plate 13 via hold down bolts 14. While FIGURE 1 only shows three fuel bundle supports 12 with two casings 10 positioned thereon, one of which is in cross section, for purpose of illustration, the reactor core as known in the art, normally consists of a large number of similar fuel bundles.

The fuel bundle supports 12 each include a central flange or collar portion 15, the upper surface 16 thereof constituting a seat or support surface for the fuel bundle casing or tube 10 (see the center fuel bundle support 12 of FIGURE 1). The flange or collar portion 15 is provided with a plurality of cut-out sections 17 within which a portion of the head of hold down bolts 14 is positioned, bolts 14 being provided with countersinks 14'. As shown in FIGURE 5, three hold down bolts 14 are used for each fuel bundle support 12 in this embodiment, adjacent bolts 14 functioning to hold adjacent supports 12 to support plate 13. Hold down bolts 14 are threadedly secured in threaded holes 18 in support plate 13 (see FIGURE 1). Fuel bundle support 12 also includes a reduced outer diameter lower end portion 19 which extends into an aperture 20 in support plate 13. An annular groove or plenum 21 extends around aperture 20 and is in fluid communication with the interior of the fuel bundle support 12 via apertures or passages 22 in the lower end portion 19 of support 12. As illustrated in the cut-away section shown in the end portion 19 of the center fuel bundle support 12 of FIGURE 1 and in FIGURE 6, a flow measurement tube 23 is secured in an aperture 24 in support plate 13 and in fluid communication with the annular groove 21, tube 23 being attached to a coolant flow measuring apparatus, not shown. Note that FIGURE 1 shows four such flow measurement tubes 23, with the upper one being adapted for attachment with another fuel bundle support, not shown, but located to the left of the figure.

The fuel bundle support 12 is closed at the upper end portion 25 but defines an internal fluid passageway 26 in the remainder thereof which includes a venturi section indicated generally at 27 with the passages 22 in the lower end portion 19 of support 12 being located at the throat portion of the venturi 27. Adjacent the upper closed end portion 25, fuel bundle support 12 is provided with a plurality of elongated slots 28 which allow fluid to flow from the internal passageway 26 to the exterior thereof, as described in greater detail hereinafter. The closed upper end portion 25 of fuel bundle support 12 is provided with a central aperture 29 within which one end of a vent tube or conduit 30 is secured, tube 30 terminating at the other end thereof in an aperture 31 in support 12, the aperture being located just below the flange or collar portion 15 of the bundle support 12.

The fuel bundle tubing or casing 10 is hexagonal in external configuration except at the lower end portion 32 which is annular and within which is secured an end support member or ring 33, the support member 33 extending beyond casing 10 and in abutment with the surface 16 of the flange portion 15 of fuel bundle support 12. Support member or ring 33 may be of the two-piece type as illustrated or singular construction. Support member 33 is provided with an annular groove 34 within which a seal assembly 35 is positioned, the seal assembly 35 being described in detail in the description of FIGURE 13. The lower end portion of support member 33 is tapered and includes a plurality of cut-aways or notches 36 at the edge thereof which allow any leakage past the seal assembly 35 to be drained into the coolant surrounding the fuel bundles. Secured via threaded holes 37 in the top of support member 33 is a plurality of rods 38 which are threadedly secured in threaded holes 39 of a pivoted yoke or rocker arm 40, as shown in greater detail in FIGURES 2 and 3. The yoke 40 is double pivoted on pins 41 (only one shown in FIGURES 1 and 3) which extends through an apertures 42 in fuel end strips 43, fuel pins or rods 11 terminating in and secured by end strips 43. As shown in FIGURES 1–3, yoke 40 is provided with a central aperture 4 through which a bolt 45 extends for insertion into a threated hole 46 in the top of an inverted cup-shaped member 47. A passage 48 extends through the upper or body portion of member 47 into the bottom of threaded hole 46 to provide a vent therefor. Also, at the upper or body portion of member 47 a passageway 49 extends therethrough which aligns with an aperture in bolt 45, through which a locking pin 50 is positioned to prevent the undesired turning of bolt 45 with respect to the inverted cup-shaped member 47. A protruding flange or side portion 51 of the inverted cup-shaped member 47 extends downwardly and about the upper portion 25 of fuel bundle support 12 defining a space 52 therebetween. The space 52 is vented through vent tube 30 to the external surface of the fuel bundle. The tip or edge of the side portion 51 of member 47 is provided with a seal assembly 53, secured in place by a retainer ring 54. If desired and provided sufficient space is available, the seal assembly 53 could be replaced with a seal assembly similar to that of assembly 35 described hereinafter with respect to FIGURE 13.

It is thus seen that the fuel bundle casing 10 is provided with a pair of members (33 and 47) which extend around and form sealed surfaces with respect to the upper end of fuel bundle support 12. As shown by the flow arrows in FIGURES 1 and 4, coolant enters the internal passageway 26 of fuel bundle support 12, from an inlet plenum 55 below support plate 13, after passing through the flow-measuring venturi 27, and flows outwardly through the elongated slots 28 into a chamber or space 56, defined by casing 10, support member or ring 33, the upper end of fuel bundle support 12 and the inverted cup-shaped member 47, and flows upwardly around the fuel pins or elements 11 for cooling same, and discharges from the top of the fuel bundle, not shown. The flow of coolant about fuel pins or elements 11 can be more clearly seen from FIGURE 3 which shows the spacing between the pins 11 and the arrangement thereof within the casing 10. In the specific embodiments of FIGURE 3, there are 265 fuel pins 11, for example, with six dummy pins 57, one being located in each corner area of the hexagonal configuration of casing 10.

It will thus be seen that the upward force caused by the hydraulic pressure of the coolant is exactly balanced by an equal downward force, provided the seals 35 and 53 are equal in area, and that the leakage flow past seal 53 into space 52 experiences a negligible pressure drop as it passes through vent tube 30. In actual practice a slight net upward force will occur since practical assembly will dictate that seal 35 be slightly larger than seal 53, and some leakage pressure drop through vent tube 30 is likely. However, this force can be easily maintained to a value considerably lower than the weight of the fuel bundle, and therefor not sufficient to lift the fuel bundle. As a safety precaution, a backup hold-down assembly, not shown, may be provided about one inch above the top of the fuel bundles, to assure that they do not move upwardly in the core of the reactor.

Although the fuel bundle inlet support 12 would permit any type of fixed inlet flow measuring device, the use of the venturi 27 and pressure tap holes 22 connected to groove or plenum 21 for connection via tube 23 and aperture 24 to a flow measuring device is preferable.

The fuel bundle casing 15 is provided with allowance for radial misalignment (of about ⅛ inch in all directions) with respect to fuel bundle support 12 by the sliding motion of seal assembly 35. Since such a provision at seal 53 would seriously interfere with the flow area or space 56 between the inverted cup-shaped member 47 and the bundle casing 15, the misalignment is provided by the rocking motion of yoke 40 via rods 38 connected to the support or ring member 33 within which seal assembly 35 is mounted.

The embodiment of the invention illustrated in FIGURES 7–12 is generally similar to that described above with respect to the embodiment of FIGURES 1–6. The primary differences between the embodiments is the change in location of the venturi flow measuring arrangement, the configuration of the apertures in the upper portion of the fuel bundle support, the configuration of the inverted cup-shaped member, the elimination of the yoke and rod type misalignment arrangement, and the elimination of the hold-down bolts. Like components will be given similar reference numbers to those utilized in FIGURES 1–6.

The fuel bundle of FIGURE 7 is composed of a generally hexagonal casing or tubing 10' containing fuel pins or elements 11' in the upper end thereof and positioned over and in abutment with fuel bundle support 12' positioned in core grid or support plate 13'.

The fuel bundle support 12' includes a central flange or collar portion 15' having an upper surface 16' which constitutes a seat or support surface for casing 10'. Fuel bundle support 12' additionally includes a reduced outer diameter lower end portion 19' which extends into an aperture 20' in support plate 13' and is supported thereby in the vertical position. An external groove or plenum 21' is formed in support 12' just above the reduced diameter lower end portion 19' and is in fluid communication with the interior of the support 12'. As illustrated in FIGURE 7 and FIGURE 12, a ring 60 is welded or outerwise secured to support 12' to close groove or plenum 21', and a flow measurement tube 23' is secured in an aperture 61 of ring 60 and thus in fluid communication with the groove or plenum 21'. Tube 23' of each support 12' is attached, as described above, to a coolant flow measurement device, not shown.

Fuel bundle support 12' is closed at the upper end portion 25' but defines an internal fluid passageway 26' in the remainder thereof which incorporates a venturi section 27', the passages 22' being located at the throat portion of the venturi 27'. Below the upper closed end portion 25', support 12' is provided with a plurality of openings or apertures 28' through which fluid flowing upwardly through internal passageway 26' is discharged into casing 10 as described hereinafter. A central aperture 29' is located in upper end portion 25' and one end of a vent tube 30' is secured therein, the other end of tube 30' being secured in an aperture 31' in fuel bundle support 12' located below the flange portion 15' thereof.

As illustrated in FIGURES 7, 9 and 10, the tubing or casing 10' is of a hexagonal external configuration except at the lower end portion 32' which is annular as clearly shown in FIGURE 11. Lower end portion 32' secured to an end support member or ring 33' which extends beyond casing 10' and rests upon the surface 16' of bundle support 12'. Support members 33' is provided with a countersink upper portion 34' within which a seal assembly 35' is positioned. The details of seal assembly 35' are identical to seal assembly 35 of FIGURE 1 and will be later described with respect to FIGURE 13. The lower end portion of support member 33' is tapered and is provided at the edge or lip thereof with notches 36' which allows drainage of fluid leaking past the seal assembly 35'. Support member or ring 33' is provided with another countersink 62 of larger diameter than countersink 34' containing the seal assembly 35'.

Fuel pins or elements 11' terminate in and are secured by a series of fuel end strips 43', as shown in FIGURES 7–9. The fuel strips 43' are each provided with an aperture 63 within which is located a pin 64 which attaches the fuel strips to an inverted cup-shaped member 47'. The inverted cup-shaped member 47' includes a protruding flange or side portion 51' which extends downwardly and is secured in countersink 62 of support member 33', the edge or lower end of portion 51' of member 47' forming the upper support for seal assembly 35'. Thus, the inverted cup-shaped member 47' is fixedly attached to and supported by support or ring member 33' which in turn is secured to casings 10' and which rests upon surface 16' of fuel bundle support 12'. The side portion 51' of the inverted member 47' may be formed in two sections secured together as shown in FIGURE 7 or as a unitary structure. The member 47' is positioned about the upper end portion 25' of bundle support 12' so as to define a space 52' therebetween which is vented via vent tube 30' to the exterior of the fuel bundle. A second seal assembly 53' similar in construction to seal assembly 35' is positioned in an annular groove or chamber 65 formed in the side portion 51' of inverted member 47' adjacent the lower section of upper end portion 25' of bundle support 12'. A plurality of openings or apertures 66 are formed in the inverted member side portion 51' intermediate the groove 65 and the terminal end thereof, openings 66 being positioned to generally align with openings 28' in bundle support 12'. A space 67 is formed by seal assemblies 35' and 53', inverted member side portion 51' and bundle support 12'.

As shown by the flow arrows in FIGURES 7 and 10, coolant enters the internal passageway 26' of fuel bundle support 12', from an inlet plenum 55' located below support plate 13', after passing through the flow-measuring venturi 27', and flows outwardly through openings 28', space 67, openings 66 into a chamber or space 56' defined by casing 10', inverted member side portion 51' and support member or ring 33', and flows upwardly around the fuel pins or elements 11' as before described. As more clearly shown in FIGURE 9, the fuel pins or elements 11' are spaced within casing 10' and are 265 in number, for example, with six dummy pins 57' being located in the corner areas of the hexagonal casing 10', as above described.

The hydraulic pressure balance and the inlet flow measuring of the FIGURES 7–12 embodiment is accomplished in the same manner as described above with respect to the FIGURES 1–6 embodiment. The misalignment feature of the FIGURES 1–6 embodiment is limited in the FIGURES 7–12 structure by the pivotal action of the inverted cup-shaped member 47' on the pin 64 due to the member 47' being secured to casing 10' at the edge or lip of the side portion 51' thereof.

Referring now to FIGURE 13, the seal assembly of both embodiments will be described in detail with the surrounding structure that of the FIGURE 1 embodiment, although the seal assembly can be that of either 35' or 53' of FIGURE 7.

The seal assembly generally indicated at 35, for example, is positioned in the annular groove 34 in support or ring member 33 of tubing or casing 10 and is adapted to form a tight seal between member 33 and the external surface 68 of bundle support 12. The seal assembly 35 is composed of a pair of retainer rings 70 and 71 interlocked by a tongue and groove arrangement indicated at 72, the groove 34 being constructed to provide room for and permit misalignment of the rings 70 and 71. Positioned in an open cavity 73 formed in rings 70 and 71 is a split ring type seal 74, the tip of which is in contact with the surface 68 of fuel bundle support 12. The split ring 74 is designed in such a way that it would not fall out if it were to break due to its retainment by rings 70 and 71. Also, the retainer rings 70 and 71 are continuous rings and are not subjected to the stresses of a spring ring. In order to provide a better contact, if desired, between the split ring seal 74 and the surface 68 a wavy spring strip could be positioned in cavity 73 behind the ring seal 74.

It has thus been shown that the present invention provides a means of preventing lifting forces on a nuclear fuel bundle due to hydrostatic pressure differential at the entrance to the fuel bundle, while permitting radial misalignment of the bundle, and providing for monitoring inlet flow to the individual fuel bundles, thereby greatly advancing the state of the art.

What is claimed is:

1. A pressure balanced fuel inlet assembly for a nuclear reactor comprising: a fuel bundle support member having an enlarged diameter central portion, and fuel bundle casing having a support ring means secured in one end portion thereof, said casing being constructed to surround in spaced relationship one end of said support member and in abutment with said enlarged central portion of said support member; said casing being adapted to contain fuel elements in the other end portion thereof; said fuel bundle support member being closed at one end and provided with an internal passageway through the remainder thereof, said passageway being configured in the lower portion thereof to define a venturi therein; said support member including a reduced diameter end portion adapted to extend into an aperture in an associated reactor core support plate for supporting said support member in a vertical position; said support member being provided between said closed end and sai central portion thereof with a plurality of openings providing fluid communication between said passageway and exterior of said support member; said fuel bundle support member also being provided with at least one passage for providing fluid communication between said venturi and an associated flow measuring apparatus; said closed end of said fuel bundle support member being provided with an aperture within which one end of a vent tube is secured, the other end of said vent tube terminating in an aperture in said support member located intermediate said enlarged central portion and said reduced diameter end portion; said support ring means being provided with a seal assembly for producing a tight seal about said fuel bundle support member; an inverted cup-shaped member operatively mounted in said casing and constructed to extend in spaced relationship around at least the closed end of said fuel bundle support member; said inverted member being provided with a seal assembly for producing a tight seal about said fuel bundle support member; whereby fluid enters said internal passageway of said fuel bundle support member, passes through said venturi and exits via said openings into the space between said support member, said casing, and said seal assemblies, and flows upwardly about the external surface of said inverted cup-shaped member toward the other end portion of said casing for cooling associated fuel elements adapted to be contained therein.

2. The fuel inlet assembly defined in claim 1, wherein said inverted cup-shaped member is retained by a yoke member, said yoke member being pivotally mounted in said casing; and a plurality of rod members interconnecting said yoke member and said support ring means, thereby permitting radial misalignment between said casing and said fuel bundle support member.

3. The fuel inlet assembly defined in claim 1, wherein said inverted cup-shaped member extends downward and is secured to said support ring means, said inverted member being provided with a plurality of openings which substantially align with said openings in said fuel bundle support member, said openings in said inverted member being located intermediate said seal assembly therein and the terminal end thereof.

4. The fuel inlet assembly defined in claim 1, wherein said enlarged central portion of said fuel bundle support member is provided with a plurality of cut-away sections; and a plurality of bolt-like means adapted to be secured to an associated reactor core support plate, said bolt-like means being retained in said cut-away sections of enlarged central portion of said support member.

5. The fuel inlet assembly defined in claim 1, wherein at least one of said seal assemblies is composed of a pair of interlocking ring members, said ring members defining an open cavity therein, and a split ring-type seal positioned in said cavity and in sealing abutment with the external surface of said fuel bundle support member.

6. The fuel inlet assembly defined in claim 5, wherein said interlocking ring members are positioned in an annular groove formed in said support ring means on the side thereof adjacent said fuel bundle support member, said groove having a depth greater than the depth of said interlocking ring members to allow for misalignment of said interlocking ring members.

7. The fuel inlet assembly defined in claim 1, in combination with a reactor core support plate, said core support plate being provided with an aperture of cooperating diameter for that of said reduced diameter end portion of said fuel bundle support member, said core support plate including such an aperture for each associated support member.

8. The fuel inlet assembly defined in claim 7, wherein said core support plate is provided with an annular groove adjacent each of said apertures therein, and at least one fluid passage interconnecting said annular groove with an external surface of said core support plate within which is adapted to be mounted a flow measurement tube for connecting said annular groove with an associated flow measurement device, said venturi in said fuel bundle support member being located in said passageway such that said passage in said support member is located intermediate said annular groove of said core support plate and a throat section of said venturi.

9. The fuel inlet assembly defined in claim 1, wherein said support ring means is constructed of a pair of sections with said seal assembly therein being located at the intersection of said pair of sections.

References Cited

UNITED STATES PATENTS 3,247,076    4/1966    Tutte et al.
3,401,081    9/1968    Menzel et al.

REUBEN EPSTEIN, Primary Examiner

U.S. Cl. X.R.

176—26, 50, 66